Sept. 2, 1958 A. MANTEGNA Re. 24,529

SEAT CUSHIONS

Original Filed July 29, 1953

INVENTOR.
ARTURO MANTEGNA
BY

United States Patent Office

Re. 24,529
Reissued Sept. 2, 1958

24,529

SEAT CUSHIONS

Arturo Mantegna, Milan, Italy

Original No. 2,775,287, dated December 25, 1956, Serial No. 371,085, July 29, 1953. Application for reissue December 18, 1957, Serial No. 704,858

Claims priority, application Italy August 8, 1952

10 Claims. (Cl. 155—179)

Matter enclosed in heavy brackets [ ] appears in the original patent but forms no part of this reissue specification; matter printed in italics indicates the additions made by reissue.

This invention relates to cushions in general and more specifically it relates to certain new and useful resilient bodies which serve for supporting the human body and for other purposes.

More specifically, my present invention is related to cushion means which serve as seat and/or back members for vehicle seats and for any other purposes in which a resilient cushion means may be requested or desired, and it has for an important object thereof the provision of a novel and improved cushion means of the character referred to above, by which a quite comfortable support is attained by the combination of a lower resilient assembly comprising a plurality of coil compression working springs evenly arranged on and supported by a base member, and of an upper compound cover assembly comprising a relatively thin layer of sponge rubber or similarly soft material and screen means arranged substantially between the upper ends of said coil springs and the lower surface of said layer so as to uniformly distribute the uplifting pressures localized on the spaced upper ends of said coil springs on the whole surface of said cover assembly.

In most of seat cushions heretofore produced and applied to cars, busses, road and rail carriages, planes and to easy-chairs and other conventional pieces of furniture, the resilient cushion member for covering the seat frame structure and for direct supporting of the human body comprises a lower resilient assembly in which the resilient means is formed by a plurality of coil springs evenly arranged in spaced relationship and designed to resiliently support a cover member upon a rigid plate of a frame base member, connected to or more integral with the said seat frame structure.

Said cover member is designed to give to the supported human body a comfortable lift and to avoid that the said spaced coil springs may exert on the oversitting human body a plurality of perceptible uplifting pressures localized on the tips of any or of the most loaded coil spring. According to current art, said cover member is made in the form of a substantially thick layer of felt, textile material, fabric, leather and the like, having a certain tension-resisting character and an inherent softness. Said conventional cover members are subject to the common objection that the cushion is made heavy, pretty expensive, and air-tight and that moisture, water and perspiration may deteriorate same. The air-tightness of said conventional cover members makes the seat uncomfortable in the summer time, in torrid zones and the like.

A certain improvement in manufacture of seats of the character and for the uses above described has been heretofore attained by the use of the so-called "sponge-rubber" material as resilient means therefor. Said material is, however, subject to the objection that its extreme softness makes it unsuitable for covering an assembly comprising the said coil springs and for rendering imperceptible the spaced tips thereof in sitting thereupon. But by constructing said cover member in the form of an excessively thick layer, the whole cushion means is made excessively high and the producing thereof excessively expensive. To overcome the above said common objection there have been heretofore produced seat cushions in which the resilient assembly is actuated by one shaped piece of sponge rubber.

Said one-piece cushions are, however, subject to some objections in view of expensiveness, of excessive softness and poor progressive lifting power, and of poor stability of the supported load, the upper surface of said one-piece cushions being subject to laterally move and to bend in any direction.

Having the above objections in view, an object of this invention is the provision of a novel and improved seat cushion compound member in which, according to the combination above touched upon, a relatively thin upper cover member of sponge rubber or like material is supported by a plurality of spaced coil springs through a flexible and tension resistant medium layer, such as a metallic screen for example, the said medium forming a pressure resistant surface upon which the said localization of the spaced resting points actuated by the several spaced coil spring tips are not perceptible by the oversitting human body.

Of course a cushion means produced according to this invention and comprising the above said substantial combination of elements may find other useful applications, such as back cushion for seats, for example.

Another object of the invention is the provision of a seat cushion of the type described in which the amount of sponge rubber required in the manufacture thereof is greatly reduced in respect to the amount comprised in said one-piece seat cushions.

A still other object of the invention is the provision of an article of manufacture of the character described in which an outer cover means of fabric or other tension resisting and pliable material is provided to connect the outline of said upper sponge rubber cover member to the outline of the said base member, for giving the desired shape to the whole cushion, confining its raising when unloaded and preventing undue distortion thereof.

A further object of the invention is the provision of a seat cushion produced by said combination and in which an ample space beneath the cover member, a cover member made of sponge-like material, and other useful features allowing a full ventilation and cooling of the cushion are provided, so that said cushion may be advantageously used in the summer time, in torrid zones and warm climate and/or conditions.

A still further object of this invention is the provision of a seat cushion in which by applying the above said novel and advantageous combination a remarkable saving in weight of the article of manufacture is attained, thus making said cushion suitable for airplanes and all other fields of practical use in which weight saving is most desired.

An important object of the invention is also the provision of a novel method of manufacture of seat cushions of the character referred to above, comprising the steps of making said screen medium layer integral with the upper sponge rubber cover member by vulcanization thereof.

Further, it is another object of the invention to provide a simplified construction of articles of manufacture of the character described, which may be readily manufactured with standard shop machines, thus reducing the cost of manufacture.

With the above and other objects and advantageous features in view, the invention consists in the features, combinations, details of constructions and arrangements of parts which will first be described in connection with the accompanying drawings and then more particularly pointed out in the appended claims.

Figure 1:
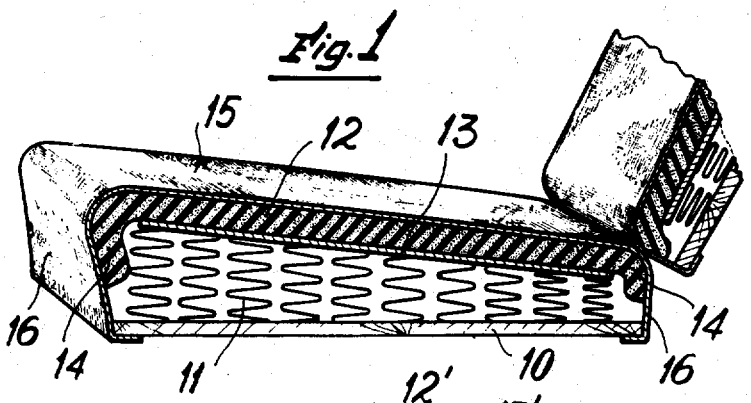
Figure 1 is a perspective longitudinal sectional view of a preferred form of embodiment of this invention, actuating a seat cushion suitable for vehicles, for example, and provided with a back cushion of like construction.

In the drawing, like reference characters refer to like parts throughout the several figures. Further, in the drawings numeral 10 indicates the base member and numeral 11 the plurality of compression working coil springs arranged on and supported by said base member, for springably supporting the cover member forming the outer load supporting surface of the cushion.

Said base member 10 and the several springs of said plurality are drawn in a rather diagrammatical way, in consideration of the fact that said members, the combination and the relative arrangement thereof may be and preferably are produced by applying current knowledge in the art.

In actual construction of a cushion according to this invention, I preferably make use of a base member 10 constructed in the form of a wooden frame, although a metallic frame, a plate member and any other structure known to those skilled in the art may be made use of, if desired. Further, the plurality of coil springs may be directly connected to and supported by a base forming element integral with or forming part of the seat or the chair structure, for example.

In the plurality [11] of coil springs *11* any single spring will be preferably arranged side by side to the adjacent ones, and the use of inter-locked coil springs will be particularly advantageous. An arrangement of springs in which the end loops of the coil-forming wire are positioned on the lower ends only is desirable, so that the upper portions of said springs present to the superimposed cover compound members a smooth and nonprojecting netlike surface.

According to this invention, in combination with the said assembly, comprising member 10 and a plurality of springs 11, the seat cushion comprises a compound cover member having an upper layer 12 and a lower layer 13, according to the basic combination and arrangement shown in Fig. 1.

The said upper layer 12 is made of a material of preferably great softness, light weight and permeable to air, such as for example sponge rubber. Other materials may be moreover used in producing said upper layers, provided that a suitable resiliency is attained, plain or alveolate rubber, resilient plastics and so on. The inherent softness of said upper layer 12 makes the contact with the upper surface thereof comfortable.

The said lower layer 13 is designed to form a medium through which the weight of the load, and in particular the human body weighing down on said upper layer 12, is transmitted to the coil spring members arranged there beneath. Preferably said lower layer 13 is made of a metallic network or screen formed by a plurality of intercrossing and closely spaced steel wires, for example, or other material having tension resisting characteristic sufficient to provide a supporting surface by which the several spaced supporting points of the coil springs tips are interconnected and by which the said upper layer 12 is supported in a substantially uniform way at any point thereof.

In practice, by the use of a steel or iron screen in which the spacing of network is say one eighth of an inch, and by the use of an upper layer formed by a couch of sponge rubber approximately ½ inch thick, a quite comfortable seat is attained and the tips of compression working coil spring members spaced approximately two inches are absolutely not perceptible by the oversitting human body.

Figure 2:
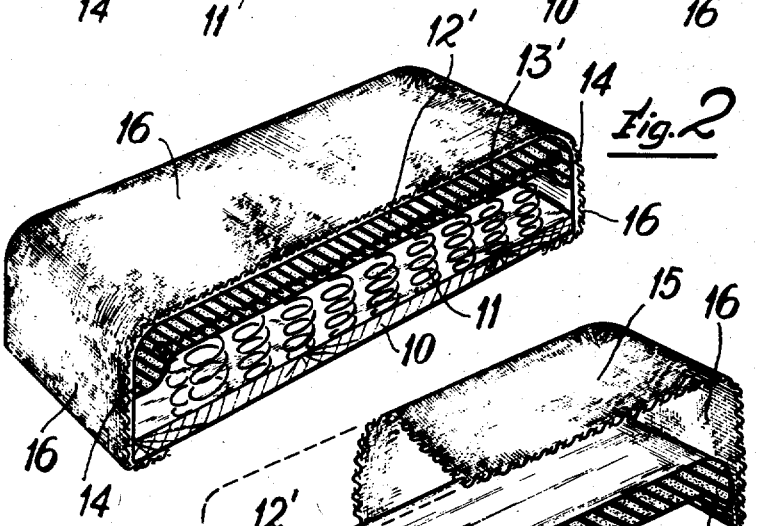
Figure 2 is a perspective transverse sectional view of a modified form of embodiment of the invention.

The said screen made or equivalent lower layer 13 may be connected to the lower surface of the sponge rubber made or equivalent upper layer 12 by any suitable means, by adhesive tape, for example. The connection may be, made on the periphery of said lower layer 13 or on a plurality of positions spaced along said periphery. In the preferred form of embodiment of the invention, shown in Fig. 2, the said lower layer is constructed in the form of a metallic screen 13' and it is made integral with the said upper layer, by embodying said screen 13' in the lower portion of the sponge rubber couch 13' forming said upper layer during the moulding and vulcanizing thereof.

In the form of embodiment shown in all figures of the accompanying drawings, the sponge rubber member forming the said upper layer is provided with down-turned edge portions 14 to shape the outer surface of the cushion in the desired conventional peripherically rounded shape and to provide the seat and/or the back cushion thereof with a smooth and resilient out-lining. The said down-turned portions 14 may be downwardly extended until the edge thereof may contact with and be connected to the edge of the base member 10, if desired, or said portions may be limited to the rounded portion of outer surface of the cushion, as shown.

A compound cover member according to this invention is peripherally connected to the under placed base member by tension resisting and collapsible means, for protection of the assembly of springs and to give to the cushion its desired shape, the said tension resisting means limiting the upward movement of said cover member when the cushion is unloaded. Preferably, said connecting means are formed by a fabric strip arranged about the cushion and connected either to the periphery of the said base member and of said compound cover member.

Preferably, I provide a seat cushion according to the invention with a complete textile covering means 15, adhering to the whole outer surface of upper layer and downwardly extending thereabout with portions 16, the lower edges of which are nailed or otherwise firmly connected to the peripheral portion of base member 10. The zone of said portions 16, comprised between the edge of base member 10 and the lower edge of down-turned extensions 14 of upper member 12, are fully collapsible as said compound cover member gets lower under the load.

Owing to the construction above described and in particular to the relatively reduced thickness of the soft upper layer 12 or 12', a seat produced according to the invention is particularly suitable for vehicle use. The outer surface, upon which the human body rests, is smooth and soft and provides a comfortable supporting and contacting surface. The reduced thickness of the soft material prevents any transverse deformation and movement of said surface under the dynamic effect of vehicle's acceleration and abrupt slowing down (said deformation and movement being a serious disadvantage to which conventional one-piece seat cushions are subject). The main spring system formed by the plurality of coil springs gives a properly progressive uplift so that felt or other poorly-wearing material is not required in the construction.

Figure 3:
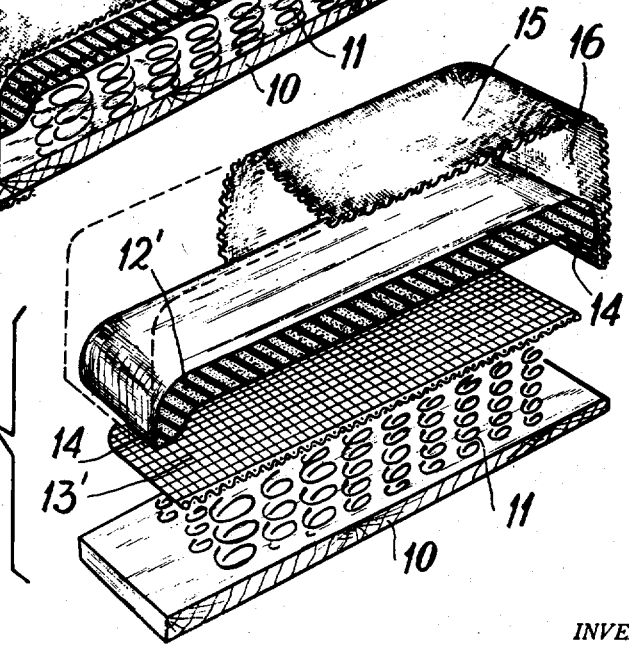
Figure 3 is a perspective exploded view of the combination of elements comprised in the form of embodiment shown in said Fig. 2.

In a preferred method of manufacture of a seat cushion of the character described, a piece of unvulcanized or partially vulcanized rubber, roughly shaped in the form of member 12' of Fig. 3, is put into a vulcanizing mould between a fabric forming the outer covering 15 and a screen forming the medium layer 13'. By applying heat and pressure, according to current art, the vulcanizing step is then performed and by said step the said screen is embedded or incorporated into the rubber near the lower surface thereof and the fabric is also embedded in the same rubber adjacent to its upper surface.

The compound article thus produced is then placed upon the assembly comprising base member 10 and the plurality of springs 11, and the outer portions of fabric are connected to the periphery of said base member.

A seat cushion of the character described will be completed and finished by applying, according to current knowledge, a leather, or plastic, or fabric protective and/or ornamental covering, which may be glued or otherwise connected to or made integral with outer covering 15, 16, if desired.

In the case of use of the seat in torrid zones and the like, where an effective cooling of the cushion and/or of the back thereof is desirable, the outer covering or coverings and the upper layer may be substantially perforated, the screen formed lower layer allowing full air to flow through all superimposed strata, so that the resiliency and the comfortableness of the seat are not adversely affected.

While I have illustrated and described the invention in a few preferred forms of embodiment thereof, I do not intend to be limited to the details shown, since various other modifications and structural changes may be made without departing in any case from the spirit of my invention.

Without further analysis, the foregoing will so fully reveal the gist of my invention that others can by applying current knowledge readily adapt it for various applications without omitting features that, from the standpoint of prior art, fairly constitute essential characteristics of this invention and, therefore, such adaptations should and are intended to be comprehended within the meaning and range of equivalents of the following claims.

What I claim as new and desire to have protected by Letters Patent is:

1. A seat cushion comprising, in combination, a rigid base member, a plurality of coil spring members uniformly arranged and spaced on said base member, each of said springs having one end thereof connected to said base member; and a resilient member extending substantially over the entire base member and being supported by the free ends of said coil spring members, said resilient member including a layer of foam plastic material and a metallic screen secured thereto over at least one face unattached to said rigid base.

2. A seat cushion comprising, in combination, a rigid base member, a plurality of coil spring members uniformly arranged and spaced on said base member, each of said springs having one end thereof connected to said base member; and a resilient member extending substantially over the entire base member and being supported by the free ends of said coil spring members, said resilient member including a layer of foam rubber material and a metallic screen vulcanized thereto over at least one face unattached to said rigid base.

3. A seat cushion comprising, in combination, a rigid base member, a plurality of coil spring members uniformly arranged and spaced on said base member, each of said springs having one end thereof connected to said base member; and a resilient member having an upper and lower surface and extending substantially over the entire base member said resilient member being supported at its lower surface by the free ends of said coil spring members, said resilient member including a layer of foam rubber material and a wire mesh vulcanized near the lower surface of said sponge rubber.

4. A seat cushion comprising, in combination, a rigid base member, a plurality of coil spring members uniformly arranged and spaced on said base member, each of said springs having one end thereof connected to said base member; a resilient member extending substantially over the entire base member and being supported by the free ends of said coil spring members, said resilient member including a layer of foam plastic material and a metallic screen secured thereto over at least one face unattached to said rigid base; and a cover member attached to the periphery of said base member, completely covering said resilient member and restricting the upward motion thereof.

5. The apparatus of claim 4 wherein said cover member is made of a fabric and is permanently bonded to the upper surface of said resilient member.

*6. A cushion comprising, in combination, a base member, a plurality of spring members secured to said base member to form a resilient seating area, and a resilient member extending substantially over the entire base member and being supported by said spring members, said resilient member including a layer of foam material having a metal screen secured thereto over the face adjacent to said spring members.*

*7. In a cushion construction, a base member, a plurality of spring members supported on said base member, and a resilient member extending over said spring member including a layer of foam rubberlike material and a metallic screen secured over one face thereof.*

*8. In a cushion construction, a base member, a plurality of spring members secured to said base member, and a resilient member having an upper and lower surface and extending over and being supported by said spring members, said resilient member including a layer of foam rubberlike material and a wire mesh vulcanized near the lower surface of said material.*

*9. In a cushion construction, a base member, a plurality of spring members supported by said base member, and a resilient member extending over said base member and supported by said spring members, said resilient member including a layer of foam rubberlike material having a metallic screen secured thereto over the lower face thereof, and a cover member attached to the periphery of said base member and enclosing said resilient member in a manner to restrict its upward movement.*

*10. In a cushion construction as recited in claim 9, wherein said cover member is made of a fabric which is permanently bonded to the uppper surface of said resilient member.*

References Cited in the file of this patent or the original patent

UNITED STATES PATENTS

| | | |
|---|---|---|
| 1,610,286 | Hood et al. | Dec. 14, 1926 |
| 2,031,175 | Stubnitz | Feb. 25, 1936 |
| 2,283,116 | Young | May 12, 1942 |